United States Patent
Klein et al.

(10) Patent No.: US 11,123,911 B2
(45) Date of Patent: Sep. 21, 2021

(54) COOLING TOOL FOR AN EXTRUDER

(71) Applicant: BÜHLER AG, Uzwil (CH)

(72) Inventors: Frieder Klein, Tägerwilen (CH); Markus Mauchle, Bischofszell (CH); Stefan Strässle, Gähwil (CH); Michael Weinberger, Brugg (CH)

(73) Assignee: BÜHLER AG, Uzwil (CH)

( * ) Notice: Subject to any disclaimer, the term of this patent is extended or adjusted under 35 U.S.C. 154(b) by 0 days.

(21) Appl. No.: 16/969,355

(22) PCT Filed: Feb. 13, 2019

(86) PCT No.: PCT/EP2019/053589
§ 371 (c)(1),
(2) Date: Aug. 12, 2020

(87) PCT Pub. No.: WO2019/158605
PCT Pub. Date: Aug. 22, 2019

(65) Prior Publication Data
US 2021/0046690 A1     Feb. 18, 2021

(30) Foreign Application Priority Data
Feb. 13, 2018   (EP) .................... 18156558

(51) Int. Cl.
*B29C 48/88*   (2019.01)
*A23K 40/25*   (2016.01)
(Continued)

(52) U.S. Cl.
CPC .............. *B29C 48/88* (2019.02); *A21C 11/16* (2013.01); *A23K 40/25* (2016.05); *A23N 17/005* (2013.01);
(Continued)

(58) Field of Classification Search
CPC .. B29C 48/88; F28D 7/103; F28D 2021/0042
See application file for complete search history.

(56) References Cited

U.S. PATENT DOCUMENTS 3,925,566  A    12/1975   Reinhart et al.
4,910,040  A     3/1990   Sagarino et al.
(Continued)

FOREIGN PATENT DOCUMENTS

CN         203 072 864 U      7/2013
DE           1 136 030         9/1962
(Continued)

OTHER PUBLICATIONS

Kirschbaum DE-1136030 English Translation (Year: 1962).*
(Continued)

*Primary Examiner* — Jacob T Minskey
*Assistant Examiner* — Adrien J Bernard
(74) *Attorney, Agent, or Firm* — Finch & Maloney, PLLC; Michael J. Bujold; Jay S. Franklin

(57) ABSTRACT

A cooling tool (1) for a food or an animal feed extruder (E), the cooling tool has: an inlet end (3) at which extrudate (4) can be led into the cooling tool (1); an outlet end (5) where the cooled extrudate can be discharged; an extrudate flow channel (6) extending from the inlet end to the outlet end; and at least one coolant flow channel (7a, 7b, 7b') connected to the extrudate flow channel in a heat-transmitting manner. In a cross section (X-X) along the primary flow direction (8), the extrudate flow channel is substantially formed as a ring section; and the outer wall (9) of the extrudate flow channel (6) is formed at least from first and second segments (10, 11). The first and second segments are connected to each other by mechanical connection elements (12). The cooling tool is suitable for wet texturing of food and animal feed.

15 Claims, 7 Drawing Sheets

(51) Int. Cl.
    *A23P 30/20*      (2016.01)
    *B29C 48/03*      (2019.01)
    *A21C 11/16*      (2006.01)
    *A23N 17/00*      (2006.01)
    *F28D 7/10*      (2006.01)
    *F28D 21/00*      (2006.01)

(52) U.S. Cl.
    CPC .............. *A23P 30/20* (2016.08); *B29C 48/03* (2019.02); *F28D 7/103* (2013.01); *F28D 2021/0042* (2013.01)

(56) References Cited

U.S. PATENT DOCUMENTS

| | | | |
|---|---|---|---|
| 6,565,900 B2 | 5/2003 | Roussel et al. | |
| 2009/0079278 A1 | 3/2009 | Kramer et al. | |
| 2013/0292089 A1 | 11/2013 | Norcross, Jr. | |
| 2017/0258125 A1 | 9/2017 | Thomas | |
| 2017/0321970 A1 | 11/2017 | Choi et al. | |
| 2018/0106550 A1* | 4/2018 | Nelson | F28F 9/0263 |

FOREIGN PATENT DOCUMENTS

| | | |
|---|---|---|
| DE | 24 06 146 | 2/1975 |
| EP | 1 059 040 A1 | 12/2000 |
| EP | 2 277 396 A1 | 1/2011 |
| EP | 2 873 941 A1 | 5/2015 |
| EP | 2 797 682 B1 | 4/2016 |
| GB | 151 258 | 7/1921 |
| JP | H06-62821 A | 3/1994 |
| WO | 96/36242 A1 | 11/1996 |
| WO | 99/13735 A1 | 3/1999 |

OTHER PUBLICATIONS

Roussel EP-1059040 English Translation (Year: 2000).*
"Brabender Protein Texturization Technology", Brabender, Jun. 2017, pp. 1-4, See International Search See European Search.
International Search Report Corresponding to PCT/EP2019/053589 dated Mar. 13, 2019.
Written Opinion Corresponding to PCT/EP2019/053589 dated Mar. 13, 2019.
European Search Corresponding to 18156558.1 dated Aug. 2, 2018.
European Action Corresponding to 18156558.1 dated Aug. 2, 2019.

* cited by examiner

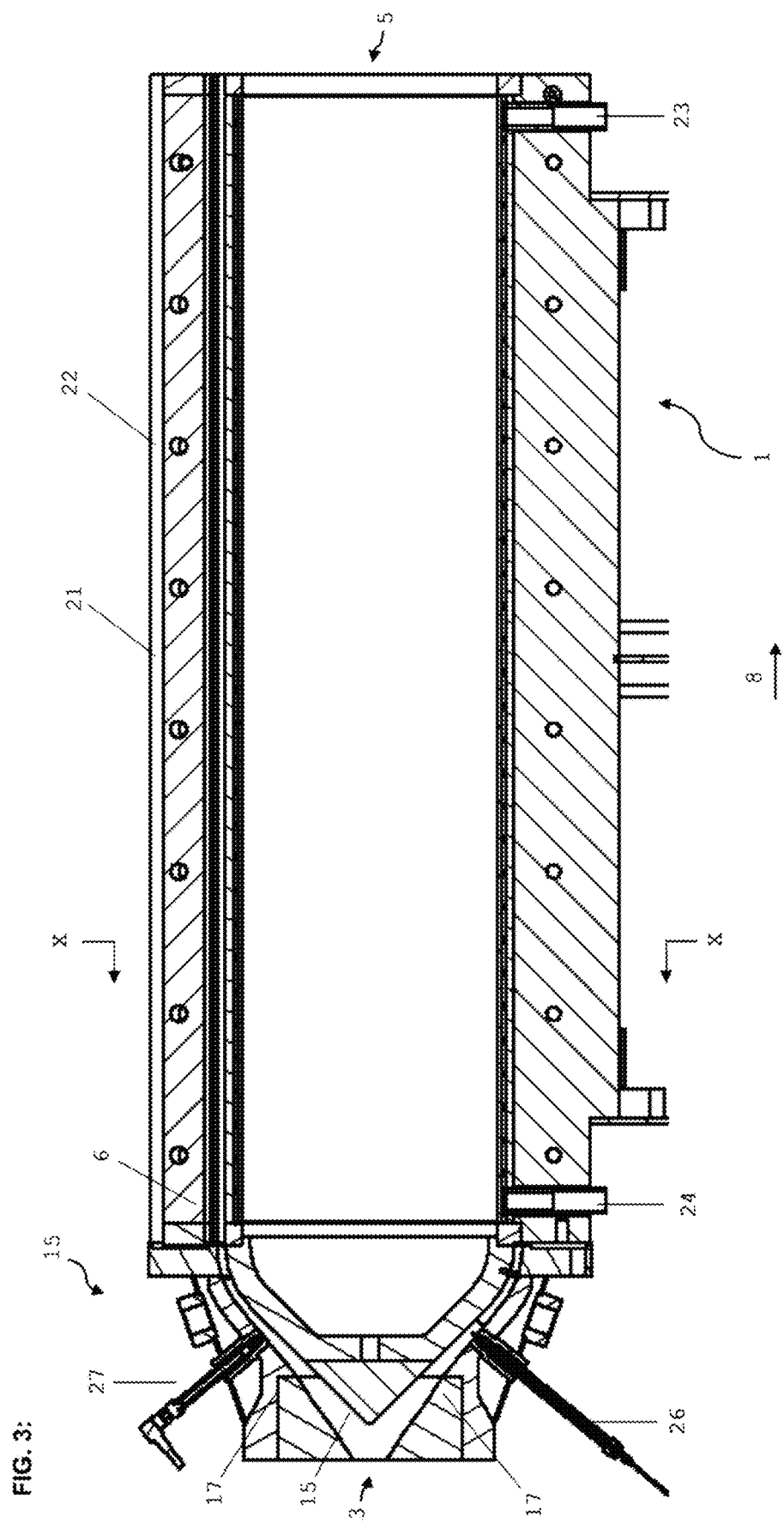

COOLING TOOL FOR AN EXTRUDER

This application is a National Stage completion of PCT/EP2019/053589 filed Feb. 13, 2019, which claims priority from European patent application serial no. 18156558.1 filed Feb. 13, 2018.

FIELD OF THE INVENTION

The invention relates to the technical field of the extrusion of foods and animal feeds.

BACKGROUND OF THE INVENTION

Extrusion of foods and/or extrusion of animal feeds frequently includes what is known as wet texturing, in which fibrous structures are formed. By way of example, this is the case when products comprising animal or vegetable proteins are extruded. A fibrous structure is not always easy to achieve, because an extrudate typically expands at the outlet of the extruder, and this is detrimental to a dense, compact, fibrous product structure. Cooling dies are therefore used in the prior art for these purposes, being arranged at the outlet of the extruder and being intended to reduce, or else if desired very substantially entirely suppress, expansion of the extrudate. However the design of these cooling dies still requires considerable improvement: by way of example, cooling is frequently insufficient and nonuniform, structure is excessively complex, and cleanability is unsatisfactory.

The prior art discloses various embodiments of cooling tools, all of which have disadvantages.

There are firstly known configurations with an extrudate flow channel that is entirely annular, disclosed by way of example in DE 24 06 146 and U.S. Pat. No. 3,925,566. In these configurations there are problems with securing of the internal jacket. This is achieved by way of example via bars, which however disrupt product flow. Even when the bars are arranged before the end of the ingoing region of the cooling tool, for example in the distributor, homogeneous reconnection of strands, in particular of protein-containing extrudate, does not occur once they have been separated, and this adversely affects appearance and texture. Bars in the end region of the cooling tool are also disadvantageous, because for reasons relating to strength they must be designed to have large volume, but they therefore cause substantial narrowing of the cross section of the product channel and likewise adversely affect the appearance and texture of the product.

There are secondly known cooling tools with flat configuration, for example disclosed in U.S. Pat. No. 4,910,040, WO 96/36242, WO 99/13735 and EP 1 059 040. However, especially for high throughput these cooling tools of flat configuration must be of very wide design, being substantially wider than the discharge aperture(s) of the extruder. This has a disadvantageous effect on homogeneity of flow velocity in the cooling tool, and this in turn has an adverse effect on the appearance and texture of the product. These cooling tools moreover require disadvantageous design, because the force resulting from the pressure of the product imposes a bending moment on the smooth wall; the structure of the wall must therefore be more robust.

There are moreover known configurations with a plurality of discrete extrudate flow channels. Designs of this type are structurally very complex, and the cooling of a plurality of discrete extrudate flow channels is also complicated and susceptible to defects arising from maintenance and from operation.

SUMMARY OF THE INVENTION

It is therefore an object of the invention to overcome the abovementioned disadvantages, and in particular to provide a cooling tool which can reliably provide excellent cooling characteristics, while also having a simple structure and being easy to clean.

The object is achieved by a cooling tool according to the invention as claimed in the independent claim(s). The dependent claims refer to advantageous embodiments of the invention.

According to the present invention, a cooling tool is in particular a cooling die for an extruder for the cooling of the extrudate of a food extruder or, respectively, feed extruder. A cooling tool of the invention for a food extruder or, respectively, feed extruder has an inlet end which can be secured on a food extruder or, respectively, feed extruder (2) and at which extrudate can be introduced into the cooling tool. The mode of securing here is preferably designed to be releasable, so that the cooling tool can easily be exchanged or disassembled for maintenance or cleaning purposes. The mode of securing preferably uses screws (for example hexagonal-headed screws), clamping levers or fasteners, where these can be used in conventional manner to achieve a defined compressive force.

The cooling tool moreover has an outlet end at which cooled extrudate can be extracted. In the region of the outlet end, the cooled extrudate can be packaged, as will be also explained below.

Essentially extending between the inlet end and the outlet end of the cooling tool there is an, in particular a single, extrudate flow channel. The extrudate flow channel here is essentially configured as ring section. According to the present invention, the shape of the ring of the ring section can in particular be that of a circle, oval, polygon, splined curve, or also combinations thereof. Preference is given to a configuration of the ring section as circular ring section.

The cooling tool moreover has at least one coolant flow channel, to which the extrudate flow channel (6) has heat-transfer connection. The heat transfer preferably takes place as heat transfer by convection.

In a cross section in relation to the main flow direction, the extrudate flow channel is essentially configured as ring section, preferably as circular ring section.

Due to the configuration as ring section a particularly uniform product distribution, uniform flow velocity and uniform cooling can be realized. It has moreover been found that designs with walls thinner than in the prior art are possible, because the pressure of the product essentially produces only tensile forces, while any bending forces produced thereby are negligible for practical purposes.

The external wall of the extrudate flow channel is moreover, in a cross section in relation to the main flow direction, composed of at least a first segment and a second segment. Particularly preferred are two segments, but a structure made of three, four or more segments is also possible. The segments here preferably are connected to one another by way of mechanical connection elements. Screws (for example hexagonal-headed screws), clamping levers or fasteners are again suitable as mechanical connection means, particularly preferred being screw connections. Due to the structure of the external wall, made of segments that can be disassembled, particularly easy and reliable cleaning of the extrudate flow channel and of the entire cooling tool is achieved.

Capacities that can be realized with this type of cooling tool are in the range of 125 to 2'000 kg/h (in particular 175 to 1'500 kg/h, more particularly 225 to 1'000 kg/h) of extrudate, while the size of the cooling tool is only small, with a typical length of 0.5 to 2.5 m (in particular 0.75 to 2.25 m, more particularly 1 to 2 m) and a diameter of 100 to 800 mm (in particular 200 to 600 mm, more particularly 300 to 400 mm).

In the regions that come into contact with the food or feed, i.e. in particular the extrudate flow channel, the cooling tool is made from stainless steel (for example EN 10088 classification numbers 1.43xx or 1.44xx) These materials feature high grades of food compatibility. The roughness of preferred materials is in the range of $R_a$ 1.6 to $R_a$ 0.8 (in accordance with DIN EN ISO 4287:1998).

According to a preferred embodiment, the extrudate flow channel is, in cross section in relation to the main flow direction, essentially configured as ring section, in particular as circular ring section, where the section comprises at least 300°, preferably comprises at least 325°, particularly preferably comprises at least 350°.

It is preferable that in the region of the cross section not covered by the ring section of the extrudate flow channel a supportive structure for an internal wall of the extrudate flow channel is arranged, extending essentially over the entire length of the cooling tool. The supportive structure is preferably a profile element.

In preferred embodiments of the cooling tool, the internal wall of the extrudate flow channel is essentially of cylindrical, in particular hollow-cylindrical, configuration. Manufacturing technology permits particularly easy production of these configurations.

It is very particularly preferable that the internal wall of the extrudate flow channel is made of a single piece. This ensures easy manufacture and good cleanability.

In preferred embodiments, the external wall of the extrudate flow channel in the operating condition is of cylindrical, in particular hollow-cylindrical, configuration. The external wall of the extrudate flow channel here is composed of segments, as described above.

In preferred embodiments, the first segment and the second segment of the external wall of the extrudate flow channel (and optionally also other segments) are secured to the above-described supportive structure by means of mechanical connection elements. The mode of securing can by way of example be realized with screws (for example hexagonal-headed screws), clamping levers or fasteners. The segments moreover are connected to one another at a further position in circumferential direction, preferably on the side opposite to the supportive structure. Mechanical connection means can also be used to realize the connection in this position, as described above. Sealing is preferably achieved via contact of the segments under pressure, purely by metallic sealing. In alternative embodiments, sealing can be achieved or assisted by an elastomer gasket inserted in particular into a depression.

In further preferred embodiments, the first segment and the second segment of the external wall of the extrudate flow channel (and optionally also other segments) are secured on the supportive structure in a manner that provides articulation and/or permits pivoting, for example by means of hinges. Due to this articulation and/or pivoting capability particularly good cleanability of the extrudate flow channel can be achieved, with minimal effort of disassembly. Sealing here can again be as set out above.

In preferred embodiments of the cooling tool, there is an in particular exchangeable distributor arranged in the region of the inlet end. The configuration of the distributor is such that extrudate can be introduced from the discharge channel (typically not annular or configured as ring section) of a food extruder or, respectively, feed extruder by way of a single distributor channel into the extrudate flow channel configured as ring section.

It has been found to be advantageous in this respect that the distributor channel has a constant cross-sectional area over at least 50%, preferably at least 70%, particularly preferably at least 90%, of the length (from the outlet of the extruder to the entry into the extrudate flow channel). It is thus possible to achieve a uniform flow velocity; this has proven to be advantageous.

In contrast to known finger distributors, the typical length of which is 10 cm or more (in particular 20 cm or more, frequently indeed 40 cm or more), with a distributor designed in the above manner no disadvantageous phenomena relating to product appearance and texture are observed, that in the prior art apparently are due to extrudate strands that are separated in the finger distributor and not subsequently homogeneously reconnected in the cooling section. There are also significant improvements, in comparison with finger distributors, in ease of disassembly and ease of cleaning.

It is particularly preferable that the distributor is of exchangeable configuration, for example can be unscrewed.

By exchange of the distributor it is possible to influence product properties in specific fashion. It has been found that a certain fibrous quality in a product can be achieved in particular via constrictions which bring about internal shear of the product, thus introducing energy into the product.

It is preferable that the distributor comprises a distributor element preferably configured as cone. Configuration as circular cone is particularly advantageous. Configuration as truncated cone, in particular as truncated circular cone, is of course also possible. In the case of configuration in the form of cone or of circular cone, the distributor can also have a pointed end in the form of a conical section; this makes it possible to influence flow behavior in a specific manner and to adjust it to the extrudate. It is possible to influence the back pressure exerted into the extruder and the degree of shear of the product. It is preferable that the distributor element has been inserted into a depression and is held in position in said depression by the pressure of the product flowing against the distributor element; exchangeability is thus particularly easily realized.

However, it is also possible that the distributor element is essentially configured to be displaceable parallel to the main flow direction. It is thus possible to influence the back pressure exerted into the extruder in specific manner. It is possible by way of example that the distributor element is configured to be displaceable in a manner such that it can be positioned at various distances from the inlet end. Positioning of the distributor element closer to the inlet end increases the back pressure that is brought about by the narrowing of the channel and is exerted into the extruder. The positioning of the distributor element can be achieved particularly easily by using a screw-threaded rod which has operative connection to the distributor element and which can be manipulated through the cooling dies from the outlet end in order to change the position of the distributor element.

In further preferred embodiments, in the region of that end of the distributor that faces away from the extruder and/or that faces toward the extruder, there is, or there can be, provided an aperture, by means of which the distributor channel can be or is narrowed. Apertures of this type can in turn be used to influence product properties in a specific manner, in particular fibrous character; long-fiber character and short-fiber character can be achieved, but also amorphous or homogeneous structures. The thickness of the aperture in main flow direction is in the range of 0.1 to 1.0 cm, preferably of 0.15 to 0.9 cm, particularly preferably of 0.2 to 0.8 cm. The disadvantages known from finger distributors are not observed with apertures (narrowings) of such small length.

In preferred embodiments of the distributor, it is configured with one or more cooling channels for the external and/or internal cooling of the distributor channel. Cooling of the distributor channel can prevent local overheating in this region. It has been found that specifically in this region of the distributor the extrudate can be subjected to greater heating than in other regions. This can be effectively counteracted by cooling in a specific manner. There can be provided a temperature sensor to determine the temperature of the extrudate in the region of the distributor, said sensor preferably being let into the wall in a manner such that it essentially does not obstruct the flow of the extrudate. The cooling can be controlled and/or regulated depending on the measured temperature, for example by adjustment of the coolant temperature and/or of the flow velocity of the coolant.

It is preferable that at least one coolant flow channel, which has heat-transfer connection to the extrudate flow channel is present on the internal side of the extrudate flow channel; and/or on the external side of the extrudate flow channel. On the internal side of the extrudate flow channel, the coolant flow channel is preferably configured helically, running around the entire circumference. On the external side of the extrudate flow channel, the coolant flow channels in both segments are respectively configured in meander shape. The coolant flow channel(s) is/are preferably completely closed, preferably welded, and also during disassembly for exchange purposes or maintenance purposes accessible only by way of the in- and outlets for the coolant. This design thus provides a simple constructional method avoiding contamination of the product. The in- and outlets can preferably be configured as spigots, and the coolant is conducted in the upstream direction, counter to the main flow direction of the product.

It is particularly preferable that coolant can be supplied to the at least one coolant flow channel on the internal side of the extrudate flow channel by way of the supportive structure. This ensures provision of a particularly reliable supply system, which does not require opening or removal of the extrudate flow channel even during disassembly, respectively for cleaning purposes.

In another preferred embodiment, there are cutter bars arranged at the outlet end of the cooling tool in the region of the extrudate flow channel, so that the cooled extrudate can be divided into strands immediately on discharge. The cutter bars can be arranged on a cutter plate mounted at the outlet end of the cooling tool in front of the extrudate flow channel. Downstream of the cutter bars there can moreover also be provided a cutter device which cuts the strands to length. This can, by way of example, be realized via a rotating blade.

In preferred embodiments of a cooling tool (not only as described above and with respect to the examples, but in principle any cooling tool for a food extruder or, respectively, feed extruder), there is an aperture arranged in the region of a distributor channel, wherein the aperture narrows the distributor channel and preferably is configured as pinhole or as aperture with slots configured as circular segments. It is possible in this respect that the circular or annular segments are configured as segments of a single circle or, respectively, ring, or as segments of different circles or, respectively, rings, as described in more detail below with respect to the examples.

With the cooling tools known hitherto it is mainly possible to achieve textures of chicken-breast type, i.e. a structure with predominantly long-fiber character. In contrast, with apertures it is possible, in particular with cooling tools of the invention, to broaden the fibrous-structure range in a manner that also permits imitation of other muscular structures of animal origin, for example beef, pork, lamb and fish, shellfish and crustaceans, etc. For example, with pinholes it is possible to produce structures which resemble beef. In contrast, with slotted apertures it is possible to produce structures which resemble fish or chicken. It is assumed that initial fibers are formed in the extruder which orientate themselves in the cooling tool. Influence on the fiber structure is advantageously achieved via apertures in the region of the distributor between extruder and actual extrudate flow channel of the cooling tool.

The apertures can be configured as metal rings or as metal disks which have a defined pattern of holes or of slots, and they can be placed at either the ingoing or outgoing end of the distributor. The pattern of holes or of slots can be symmetrical or asymmetrical, and in principle can have a wide range of geometrical shapes. Preference is given to straight and curved slots, and also to holes, but it is also possible to use star shapes, crosses, and also ornamental shapes. Curved slots, in particular as implemented in the examples, lead to very long fiber structures with high robustness, whereas straight slots promote crosslinking of the product. Holes in turn separate the product into fine fibrous filaments.

The product reaches the aperture generally in a pretextured state, i.e. initial fibers and filaments have been formed. The aperture causes a brief acceleration of flow, followed by retardation on exit from the aperture, with associated reorientation of the fibers or filaments.

The advantage of above-described apertures resides in particular in process variability. Apertures can be used not only to achieve the commonly favored chicken-breast-fillet structure but also, without major effort, to achieve other textures such as pork, beef, lamb and fish, etc.

Another aspect of the invention concerns a food extruder respectively, feed extruder, which is equipped with at least one cooling tool as described above.

Another aspect of the invention concerns a process for the extrusion of a wet-textured product, comprising the step of passage of a protein-containing extrudate through a cooling tool as described above which is arranged at the outlet of a food extruder respectively feed extruder.

BRIEF DESCRIPTION OF THE DRAWINGS

Other advantages of the present invention will be apparent hereinafter from the following description of examples with reference to the figures. Identical reference signs in the figures denote identical elements.

FIG. 3 shows a longitudinal section through a cooling tool of the invention along the plane Y-Y in FIG. 2;

DETAILED DESCRIPTION OF THE PREFERRED EMBODIMENTS

Figure 1:
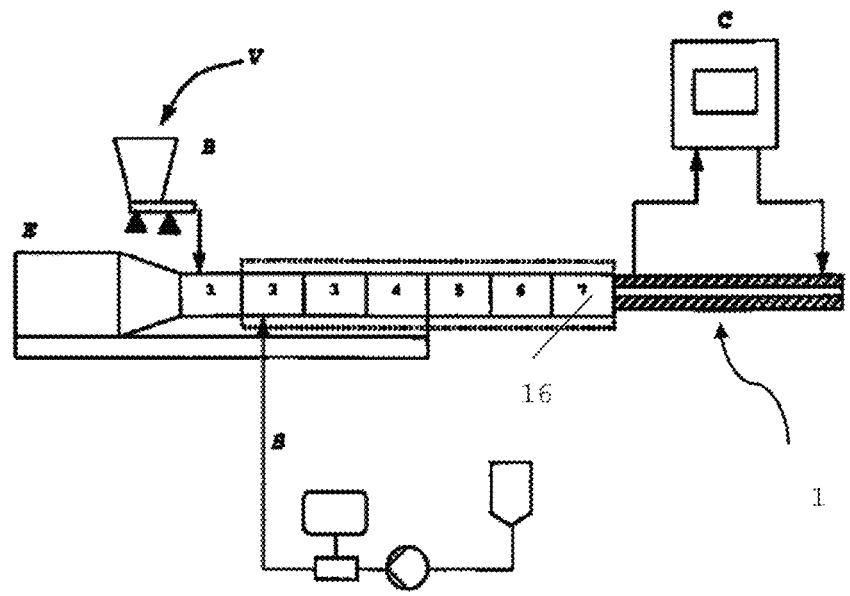
FIG. 1 shows (schematically) an arrangement of a cooling tool on a food extruder respectively feed extruder.

FIG. 1 shows schematically an extruder E composed of segments (1-7). A raw material V is introduced via the gravimetric metering system B. Water or steam is introduced via a supply line S. Reference sign 1 denotes the cooling tool. The coolant is preferably introduced at the downstream end of the cooling tool, and discharged at the upstream end of the cooling tool. The flow direction of the coolant is therefore opposite to the flow direction of the extrudate. The coolant temperature can be adjusted (controlled or regulated) by way of a temperature-regulation system; this is illustrated by the controller C. Particularly preferred, the temperature-control system is construed such that expansion of the cooled extrudate can be controlled, and preferably essentially entirely suppressed. However, for certain products it can also be useful and enabled to permit a certain degree of expansion of the cooled extrudate: this can by way of example be desired in the case of products intended for subsequent marination, because adhesion of the marinade is thus improved. It is also possible to influence sensory properties, so that for example a texture such as that of "pulled pork" or the like is achieved. Again, this can become possible via control or regulation by the temperature-control system.

Figure 2:
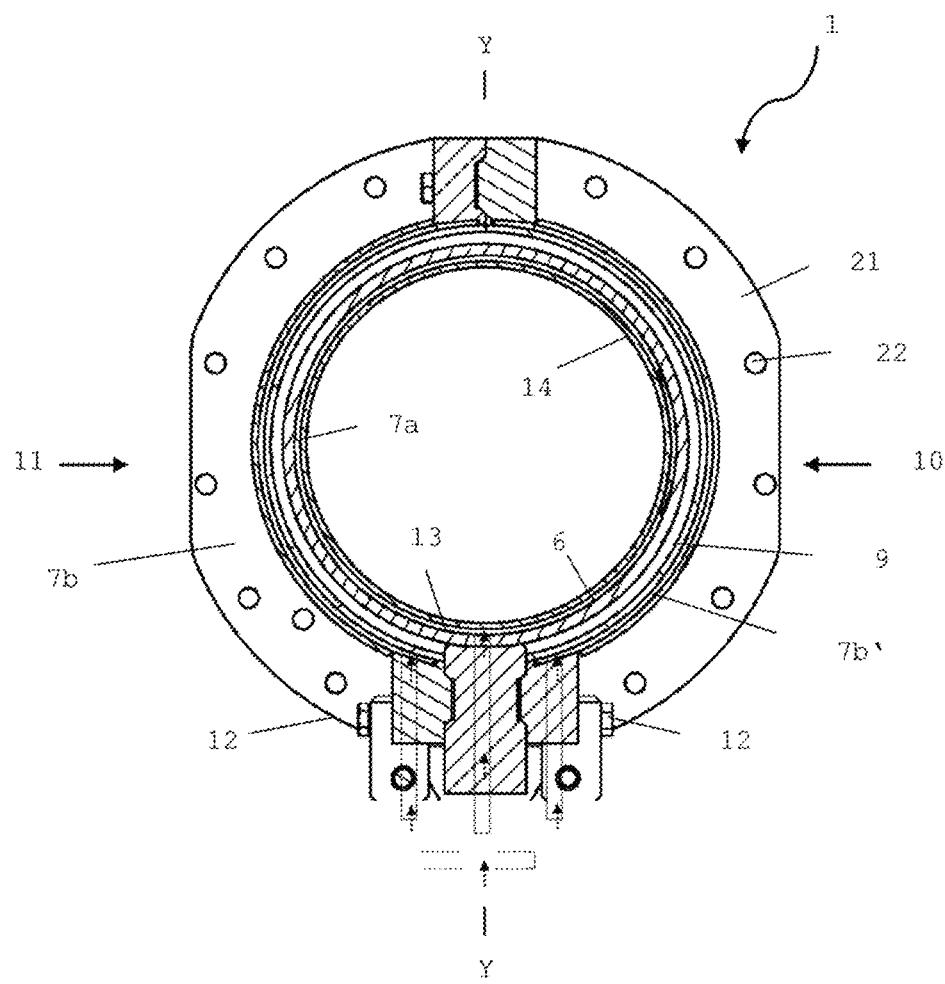
FIG. 2 shows a cross section through a cooling tool along the plane X-X in FIG. 3.

FIG. 2 shows the cross section through a cooling tool 1 along the plane X-X indicated in FIG. 3 (with viewing direction). The flange 21 in the region of the inlet end of the cooling tool can be seen. In this flange 21, there are passages 22 in which mechanical connection elements 12 can be arranged for the mounting of the distributor 15 (shown in detail in FIGS. 3 and 5). The supportive structure 13 is shown in the lower region. The extrudate flow channel 6 adjoins both sides of the supportive structure, and forms a ring section interrupted only by the supportive structure 13. Passing through the supportive structure 13, there are likewise arranged mechanical connection elements 12 arranged, which secure the first segment 10 and the second segment 11 of the external wall of the extrudate flow channel 6. The external wall 9 is configured as hollow wall, and therein are coolant flow channels 7b and 7b' configured with meander shape. The internal wall 14 is likewise configured as hollow wall, and therein is also a helically configured coolant flow channel 7a. It is preferably possible to supply coolant mutually independently to the coolant flow channels 7a of the internal wall 14 and the coolant channels 7b and 7b' of the external wall 9, and to control and/or regulate, mutually independently, the temperatures of the respective coolants. However, coolant can also be supplied jointly thereto, particularly preferably via the supportive structure 13, as indicated by broken lines in the lower region of the figure.

FIG. 3 shows the longitudinal section through a cooling tool along the plane Y-Y that is indicated in FIG. 2. The inlet 23 and the outlet 24 for the coolant can be seen in the lower region. The inlet 23 provides supply both to the interior coolant flow channel 7a and to the exterior coolant flow channels 7b and 7b', as indicated by broken lines in FIG. 2. The distributor 15 with the distributor element 15a is arranged in the left-hand region of the figure at the inlet end 3 of the cooling tool 1. Extrudate passes from a discharge channel 16, not shown, of an extruder into the distributor 15, and is then passed into the distributor channel 17, which subsequently migrates into the extrudate flow channel 6 of the cooling tool 1. Reference sign 8 indicates the main flow direction; accordingly, the outlet end 5 of the cooling tool is arranged in the right-hand region of the figure. A pressure sensor 27 and a temperature sensor 26 are moreover arranged in the distributor 15. The determined values for pressure and temperature can advantageously be used for the control or regulation of operating parameters (for example of the extruder, and/or of the coolant temperature(s) of the cooling tool and/or of the distributor), and/or also for the monitoring of the process and/or for ensuring reproducibility.

Figure 4A:
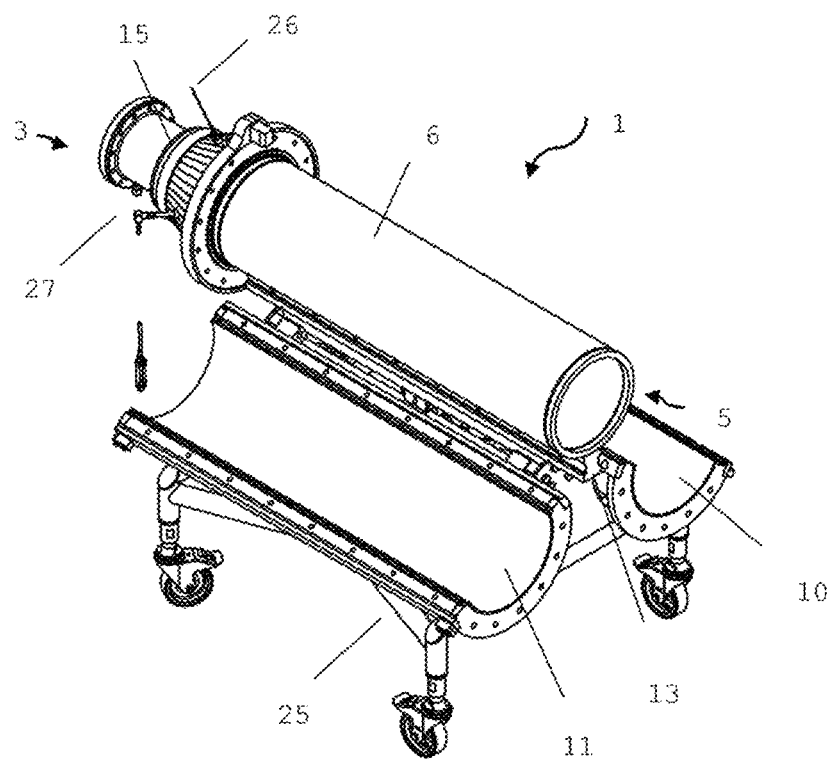
FIG. 4a/b shows a cooling tool with external-wall segments that are pivoted outwardly respectively brought together.
Figure 4B:
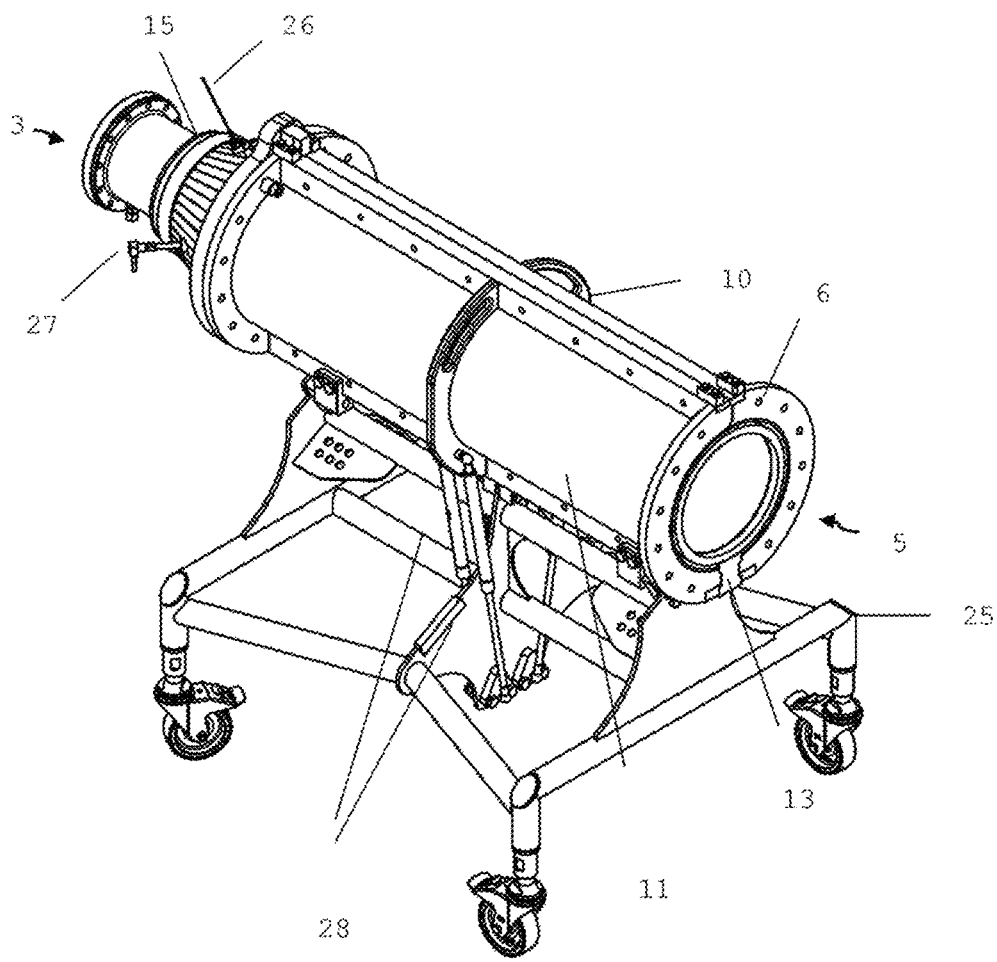

FIG. 4a shows a cooling tool 1 with segments 10 and 11 of the external wall pivoted outwardly; the inlet region 3 is arranged in the rear part of the figure, and the outlet region is arranged in the front part of the figure. The distributor 15, with the temperature sensor 26 and the pressure sensor 27 on the distributor, can be seen. The two segments 10 and 11 are secured on the supportive structure 13 with hinges so that, on a suitable support, for example a maintenance and transport trolley 25, they can easily be pivoted apart after prior release of their connection to one another in that region of the cooling tool 1 that is opposite to the supportive structure 13. The entire extrudate flow channel 6 is then open, and is accessible in an ideal manner for cleaning purposes. The supportive structure is secured by screws on the trolley 25. The arrangement on the trolley 25 is also advantageously retained during operation. The trolley 25 requires little space, and permits uncomplicated adaptions and modifications at any time. FIG. 4b shows the cooling tool 1 with segments 10 and 11 brought together. The segments 10 and are supported on gas-pressure shock absorbers; this ensures easy maintenance. When segments 10 and 11 have been brought together, the extrudate flow channel 6 can be seen in the outlet region 5.

Figure 5:
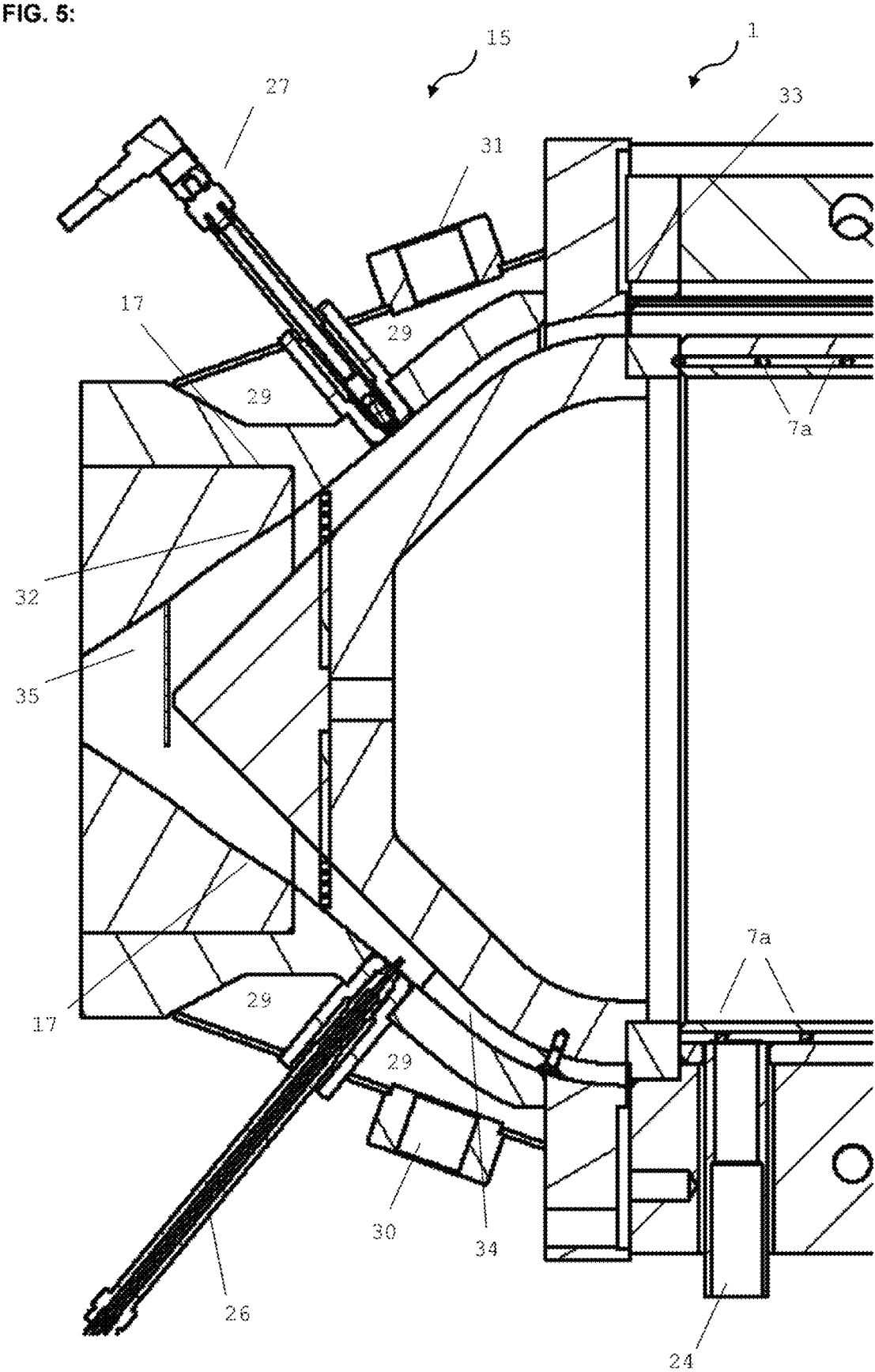
FIG. 5 shows a distributor and an inlet region of the cooling tool in longitudinal section.

FIG. 5 shows an enlarged view of the distributor 15 and the inlet end 3 of the cooling tool 1 in longitudinal section along the plane Y-Y indicated in FIG. 2. The distributor 15 is arranged in the left-hand part of the figure, with a distributor cone 15a, the pointed tip of which is oriented in a direction opposite the main flow direction. This distributor cone 15a is secured by a simple plug connection. At the pointed end of the distributor cone 15a, there is arranged an aperture 35 (at a location also designated as position III) which is configured as slotted aperture. Behind the distributor cone, there is another aperture 32 arranged (at a location also designated as position II), which is configured as pinhole. The holes and, respectively, slots of the apertures 32 and 35 narrow the distributor channel 17, and serve for the texturing of the product. In the region of the transition to the cylindrical region of the cooling tool 1, there is arranged another aperture 33 (at a location also designated as position I), which here is configured as slotted aperture and likewise serves for the texturing of the product. The distributor is cooled by way of a coolant space 29; reference signs 30 and, respectively, 31 denote inlet and outlet, hose clamps being advantageously used here. In the distributor 15, a pressure sensor 27 and a temperature sensor 26 are provided at respectively into the distributor channel 17, through the coolant space 29. In the lower region, a wedge 34 can be seen. This provides a transition from the annular distributor channel 17 into an extrudate flow channel 6 configured as ring section. In the lower region of the cooling tool 1, the configuration of the extrudate flow channel 6 is not formed continuously (see FIG. 2). The coolant outlet 24 can be seen in the lower region; the helically configured interior coolant flow channel 7a can be seen in the right-hand part of the figure.

Figure 6A:
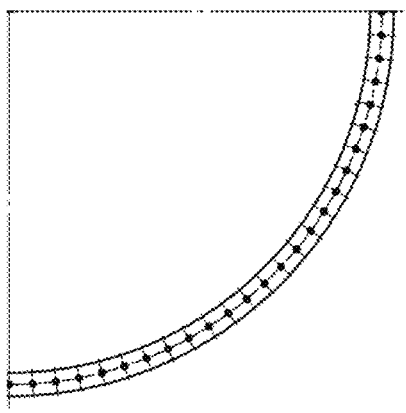
FIG. 6a/b show a perforated aperture and product textured thereby.

FIGS. 6a/b and 7a/b show various geometries of apertures and of products textured with such apertures. The procedure here was in each case as follows:

The dry components, e.g. soya protein concentrate, were metered into the extruder (40% at 500 kg/h), where they were mixed with water (60% at 500 kg/h) to give a dough. Addition of other components such as salts, colorants and flavorings, acids, alkalis, etc. is possible, but not compulsory. The raw-material mixture is heated in the extruder by means of mechanical energy (rotation of the extruder screw) and thermal energy (temperature control of extruder barrel), to 120-160° C., in particular to 135-145° C., depending on the protein source. The protein structures unfold, reorientate themselves, and form new fiber structures. In each case, an aperture was installed in the transition from the extruder into the cooling tool, in the region of the distributor; however, for the purposes of the invention it is also possible to install a plurality of sequentially arranged apertures. The extrudate was cooled in the cooling tool from by way of example ~140° C. to 60-120° C., in particular 85-110° C., and can then be further processed.

Figure 6B:
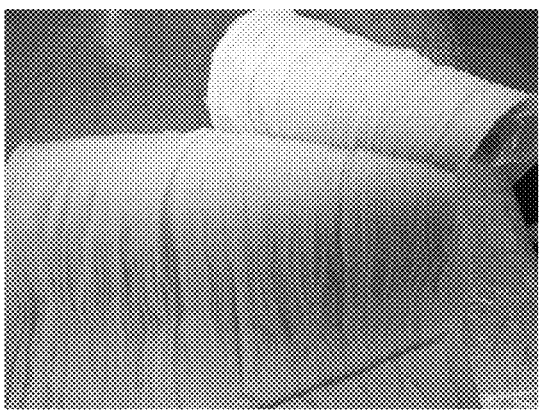

FIG. 6b shows a product of this type which was passed through a cooling tool of the invention with a pinhole illustrated sectionally in FIG. 6a (33, arranged at position I; cf. FIG. 5) in the region of the distributor. The area of the holes is 490 mm$^2$, with a product flow rate of 500 kg/h. The texture of the resultant product exhibits a filamental structure which resembles roast beef.

Figure 7A:
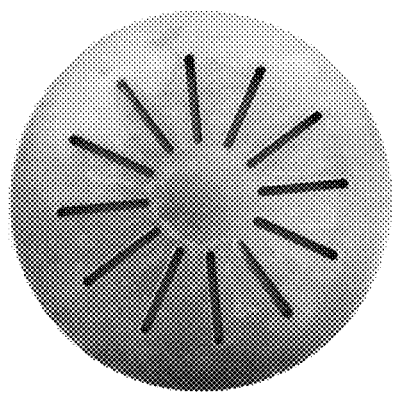
FIG. 7a/b show a slotted aperture and product textured thereby.
Figure 7B:
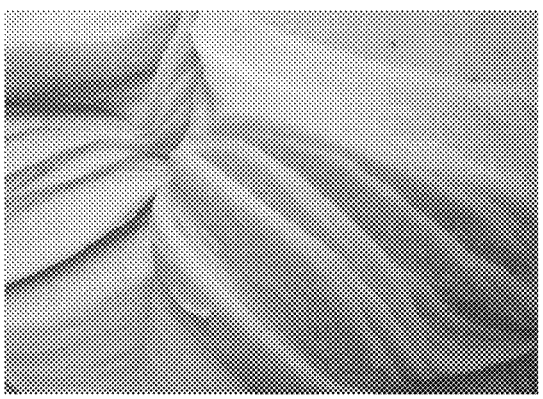

FIG. 7b shows a product of this type which was passed through a cooling tool of the invention with a slotted aperture shown in FIG. 7a (35, arranged at position III; cf. FIG. 5) in the region of the distributor. The texture of the resultant product exhibits a fine/short-fiber fish structure.

Figure 8:
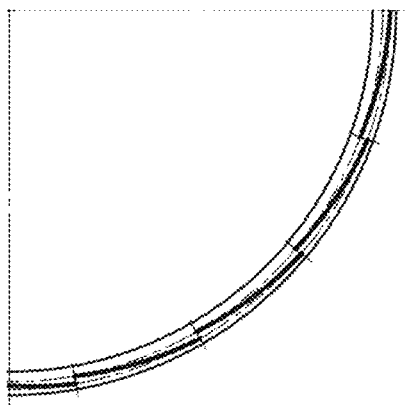
FIG. 8 shows a slotted aperture, where the slots are configured as mutually offset ring sections.

FIG. 8 shows an aperture in which the slots are configured as ring sections, where start and end of the ring sections (in circumferential direction) are arranged at a different distance from the center of the aperture. It is thus possible to substantially avoid, in circumferential direction, regions having no slots. Use of this type of aperture gives a fish-like, fine/short-fiber structure.

Figure 9:
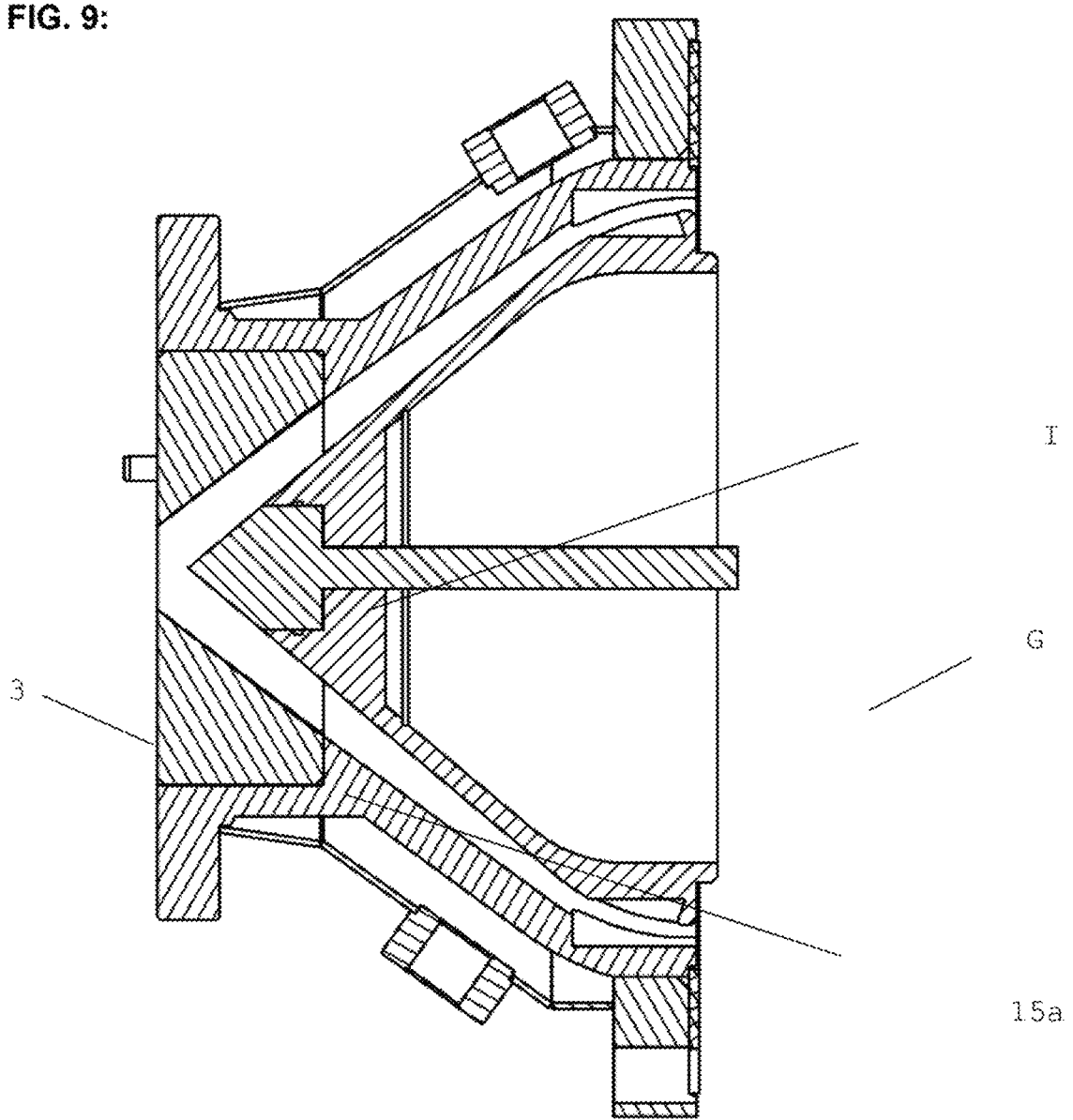
FIG. 9 is a schematic representation of a displaceable distributor element.

FIG. 9 schematically shows a displaceable distributor element 15a. The distributor element 15a here has not merely been plugged into a depression in which it is retained in position by the pressure of the product flowing against the distributor element, as described above. Instead, the distributor element 15a has operating connection to a screw-threaded rod G, which can be manipulated from the product-outlet end. The screw-threaded rod G is provided within a bushing with internal screw thread I. Rotation of the screw-threaded rod G moves the distributor element 15a in a direction towards the inlet 3 or away from the inlet 3. The back pressure exerted into the extruder can therefore be influenced in specific and particularly simple manner, in particular also during continuous operation, by narrowing/widening of the channel.

Figure 10:
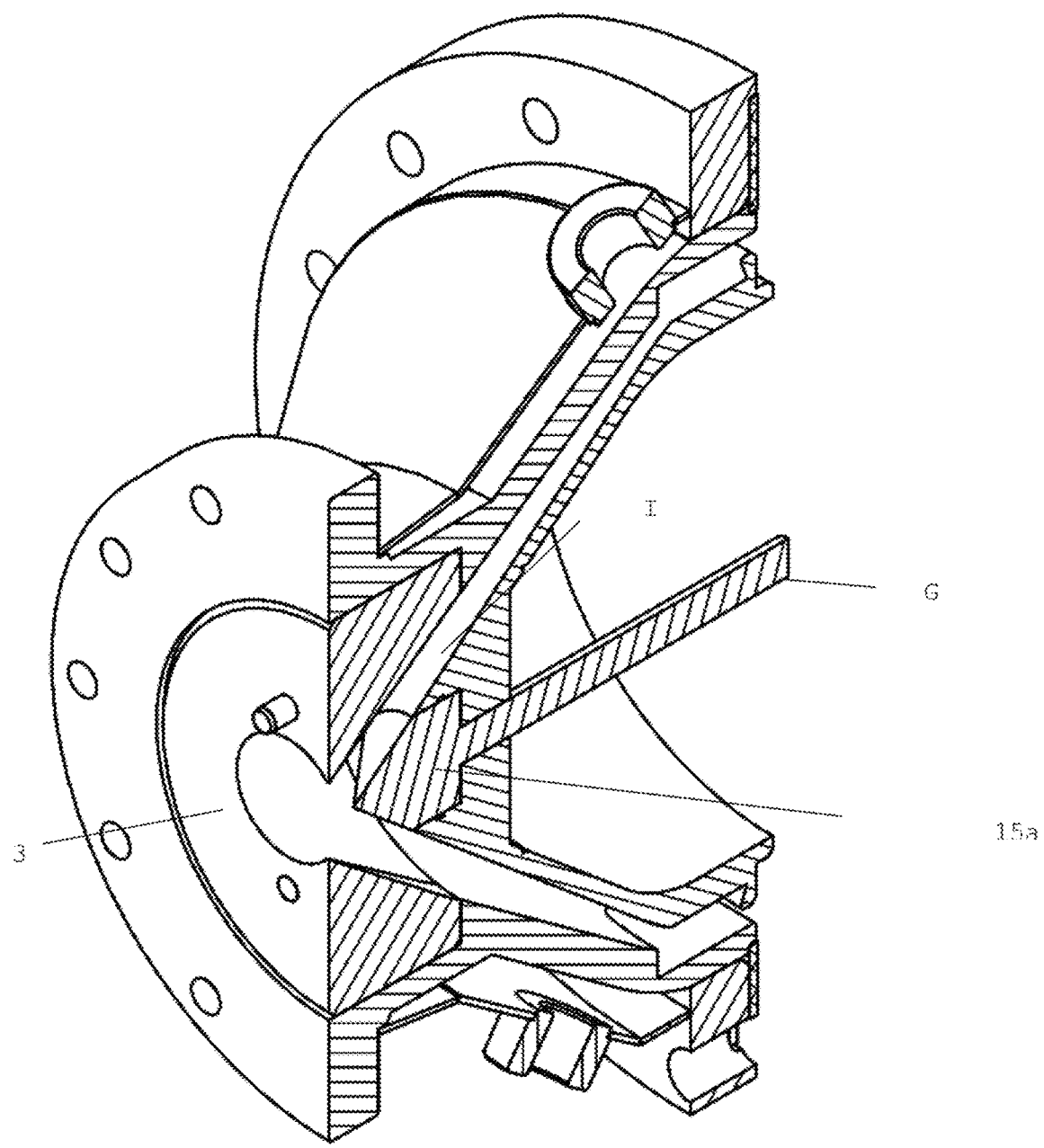
FIG. 10 is a perspective view of FIG. 9.

FIG. 10, similarly to FIG. 9, shows a perspective section. The distributor element 15a displaceable by means of a screw-threaded rod G, can again be seen. The screw-threaded rod is, at least in some regions, provided within an internal screw thread I.

The invention claimed is:

1. A food- or feed-extruder cooling die, having
   I) an inlet end, which is able to be fastened to a food or feed extruder and at which the extrudate is introducible into the cooling die;
   ii) an outlet end, at which cooled extrudate is able to be discharged;
   iii) an extrudate flow duct, which extends substantially from the inlet end to the outlet end;
   iv) at least one coolant flow duct, to which the extrudate flow duct is connected for heat transfer;
   wherein, in a cross section to a main direction of flow,
   v) the extrudate flow duct is configured substantially as a ring sector; and
   vi) an outer wall of the extrudate flow duct is formed at least from a first segment and a second segment, wherein the first segment and the second segment are connected together via mechanical connecting elements.

2. The cooling die according to claim 1, wherein the extrudate flow duct is configured in cross section to the main direction of flow substantially as a ring sector, in particular as a circular ring sector, of at least 300°, preferably at least 325°, particularly preferably at least 350°.

3. The cooling die according to claim 2, wherein, in the region of the cross section that is not covered by the ring sector of the extrudate flow duct, a supporting structure, extending substantially along the entire length of the cooling tool, for an inner wall of the extrudate flow duct is arranged.

4. The cooling die according to claim 1, wherein an inner wall of the extrudate flow duct is formed in a substantially cylindrical, in particular hollow cylindrical, manner.

5. The cooling die according to claim 4, wherein the inner wall of the extrudate flow duct is formed in one piece.

6. The cooling die according to claim 1, wherein the outer wall of the extrudate flow duct is formed in a cylindrical, in particular hollow cylindrical, manner in an operating state.

7. The cooling die according to claim 3, wherein the first segment and the second segment of the outer wall of the extrudate flow duct are fastened to the supporting structure by mechanical connecting elements.

8. The cooling die according to claim 7, wherein the first segment and the second segment of the outer wall of the extrudate flow duct are hinged and/or fastened in a pivotable manner to the supporting structure.

9. The cooling die according to claim 1, wherein, in the region of the inlet end, an in particular exchangeable distributor is arranged, which is configured such that extrudate is able to be fed from an outlet duct of the food or feed extruder, via a single distribution duct, to the extrudate flow duct configured as a ring sector.

10. The cooling die according to claim 9, wherein the distributor comprises a distribution element, which is configured as a cone, in particular a circular cone; or a cone frustum, in particular a circular cone frustum.

11. The cooling die according to claim 9, wherein, in the region of the distributor, in particular in a region of the end of the distributor that faces away from the extruder and/or in a region of the end of the distributor that faces the extruder, an aperture is arranged or able to be arranged, with which aperture the distribution duct is constricted or able to be constricted.

12. The cooling die according to claim 9, wherein the distributor is formed with one or more cooling ducts for cooling the distribution duct from the outside and/or inside.

13. The cooling die according to claim 1, wherein at least one coolant flow duct, which is connected to the extrudate flow duct for heat transfer, is present:
 on the inner side of the extrudate flow duct; and/or
 on the outer side of the extrudate flow duct.

14. The cooling die according to claim 13, wherein the at least one coolant flow duct on the inner side of the extrudate flow duct is able to be supplied with coolant via the supporting structure.

15. A cooling die in particular according to claim 11, having an aperture in the region of a distribution duct, wherein the aperture constricts the distribution duct and is configured in particular as a perforated aperture or as a aperture with segmented slits, which are in the form of circle segments.

* * * * *